Dec. 16, 1969 W. H. SMITH 3,483,619
DENTAL REST FOR JAWS IN AN OPEN BITE POSITION
Filed April 26, 1966

INVENTOR.
WALTER H. SMITH

BY Roy Mattern jr.

ATTORNEY

United States Patent Office 3,483,619
Patented Dec. 16, 1969

3,483,619
DENTAL REST FOR JAWS IN AN OPEN BITE POSITION
Walter H. Smith, 2551 28th W.,
Seattle, Wash. 98199
Filed Apr. 26, 1966, Ser. No. 545,394
Int. Cl. A61c *3/00;* A61b *1/24*
U.S. Cl. 32—40   3 Claims

ABSTRACT OF THE DISCLOSURE

A dental rest for patients jaws to comfortably receive them in an open bite position, comprising three structural supports all arranged on a planar body and radially spaced out from the body center and also circumferentially spaced from each other so one structural support will contact principally one tooth in one jaw and two structural supports will contact respective teeth in the other jaw. Further, this overall dental rest is pliable enough to permit a dental patient to adjust his jaws a bit without dislodging the dental rest as dental work proceeds. This three structural support dental rest readily self adjusts to the respective different arcuate motions of the upper and lower jaws.

---

This invention pertains to practice of dentistry. More particularly, the invention relates to the construction and use of a dental bite rest which is placed quickly and conveniently into a patient's mouth by a dentist to keep his patient's jaws apart, at least to a predetermined arcuate distance, to provide jaw clearance while dental treatment is underway.

The purpose of this invention is to provide a dental rest for comfortably holding the patient's jaws apart by continuously offering the patient his own opportunity of acquiring some position readjustment. This is true because the dental rest is controllable by the patient, to some degree, by virtue of its flexibility derived both from its form and pliable materials.

In accomplishing this purpose several objectives have been attained. Some surfaces are provided which are easily gripped by the teeth of the jaws. Other surfaces are provided which are easily gripped by the dentist's fingers or instruments upon its installation and removal. A locating flange is provided for placement adjacent teeth on a respective cheek side. Such placement of this flange positions teeth gripping surfaces of this dental rest between upper and lower teeth of patient's respective jaws. These flange and teeth gripping surfaces of this dental rest are arranged for increased flexibility in a favored partial biting motion. Moreover, the gripping surfaces of each dental bite or jaw rest provide a three point support for open jaws on a respective mouth side. In addition, all surfaces are easily cleaned and sterilized in a reusable dental rest. However, upon election, this dental rest is manufactured economically using relatively inexpensive materials thereby providing a one use throw away dental bite or jaw rests. In all sizes, child, youth and adult, the overall configuration of this dental rest provides maximum clearance for the dentist's performance of his necessary dental services.

Figure 1:
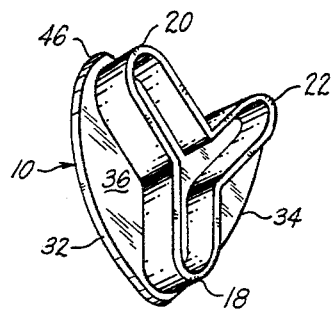
Figure 2:
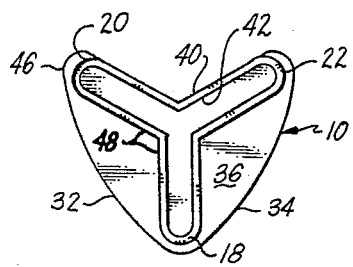
Figure 3:
Figure 4:
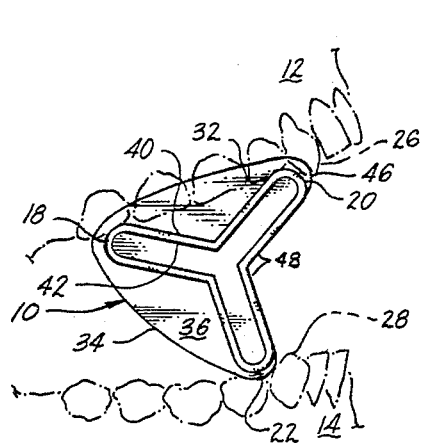
Figure 5:
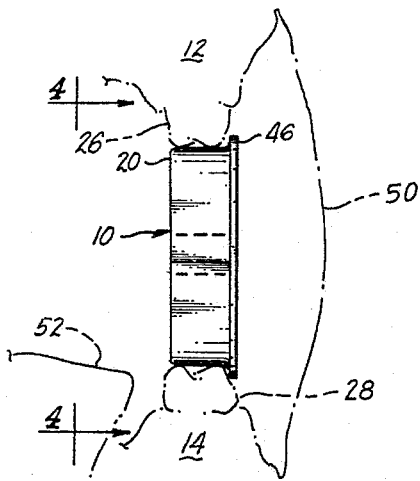

This purpose and these and other objectives of the invention will become more apparent as the following description is read in conjunction with references that are made to drawings wherein:

FIGURE 1 is a perspective of the dental rest;
FIGURE 2 is an inside view of the dental rest;
FIGURE 3 is an end view of the dental rest;
FIGURE 4 is an inside view of the dental rest positioned between a patient's jaws, the latter shown in dotted lines, as viewed from the mouth interior; and,
FIGURE 5 is an end view of the dental rest positioned between a patient's jaws, as viewed from the interior of the patient's mouth with the jaws, cheek and tongue being shown in dotted lines.

This illustrated dental rest 10 for jaws 12, 14 in an open bite position is a preferred embodiment of a three support location dental rest. The three supports 18, 20, 22 are essentially located in a major geometric plane which is orientated between teeth 26, 28 of respective jaws 12, 14 on a respective side of a patient's mouth. Such a three support dental rest also called bite rest or jaw rest, is universally adaptable to both regular and irregular teeth and jaw arrangements.

Controlled direction of its maximum flexibility by selective web joining 32, 34 between the three supports 18, 20, 22, further enhances the adaptability of this dental rest. Moreover, this omission of a joining web in outside or connecting body 36, formed of the webs, between supports 20, 22, provides "operating clearance" for dental work as illustrated in FIGURE 4. Additional conformity to jaw structures is made possible by arranging the three supports 18, 20, 22 on or as a part of a Y inside body 40 which is made quite flexible by selective use of resilient material and by leaving a Y cavity 42 which originates at continuing outside body 36.

Convenient positioning of dental rest 10 is undertaken because webs 32 and 34 of outside body 36 are easily gripped. Also rim or flange 46, formed by extending body 36 slightly beyond each of the supports 18, 20, 22, is easily located and fitted on the jaw sides nearest patient's cheek 50 and indicate correct placement of dental rest 10. However, it will be noted that no flange is used on the opposite side to give maximum freedom to tongue 52 and the placement of dental rest 10.

Once in place as indicated in FIGURES 4 and 5, the dental rest 10 effectively functions to keep patients' jaws apart. If, however, a patient needs some movement to his jaws biting down will cause some flexure of dental rest 10. Because no web is used in outside body 36 between supports 20 and 22 deflection between supports 20 and 22 will more readily occur in this radial sector than deflection between supports 18 and 22. This overall effect serves to provide a patient with some jaw position adjustment relief while still maintaining a good overall open jaw position to insure uninterrupted continuance of a dentists services.

In regard to informative specifications with respect to one specific embodiment, an entire dental rest is made of a material known as "Elvax$_{TM}$" which is essentially polyvinyl-chloride. The thickness of such material is ⅛ of an inch. Flange 46 of outside body 36 extends at least ⅛ of an inch beyond supports 18, 20, 22. The Y shaped inside body 40 is also of ⅛" thick material. Looking at the Y shape each radial leg, arm or branch 48 is ⅜" wide overall. All radial legs, arms or branches 48 project away ⁷⁄₁₆" from outside body 36. With the Y arranged so that both webs 32 and 34 are to the left and right, the vertical dimensions of either support 20 or 22 above support 18 is 1⅝" for a large size, 1½" for a medium size and 1⅜" for a small size.

Other materials of similar advantages could be used and some size changes might be in order to acquire the wanted functional advantages previously discussed. Also in this illustrated embodiment the cavity 42 could be made variable in its depth or filled with either like or unlike materials to provide models of various flexibility depending on the initial selection of materials and the specified overall flexibility sought. In conjunction with such changes the web 32, 34 could be reduced or eliminated also, to vary the overall flexibility sought. However, as noted previously, they do help in controlling the place direction and/or pattern of flexure and also serve as a gripping place when dental rest 10 is placed or removed from the patient's mouth. Inside flanges could be used so that both sides of the teeth and gum would be contacted. However, such construction would only be necessary where some younger patients would not have sufficient self control and also where webs were not to be relied upon for deflection control and/or for gripping with dental instruments or fingers.

The overall result in practicing this invention is the provision of a dental rest of three principal supporting places in its embodiments which is not distasteful to the patient; which is somewhat relaxingly movable in a biting direction by the patient so he or she may relax mouth opening muscles without causing its dislodgement; which is easily installed and removed by the dentist; which is sturdy enough to maintain operational clearances; which is easily made variable in its flexibility; which is economical to provide and to care for, being either easily cleaned or being manufactured at a low cost so it may be thrown away after one patient's use; and which, because of its essential three supporting places, conforms to the variable movement between upper and lower jaws of all patients and to the irregular tooth or jaw forms of any patient.

I claim:

1. A dental rest comprising means forming an essentially planar body, three jaw supports projecting laterally from one side of said body said supports being arranged in Y form and terminating at their outer ends in jaw contacting portions the edges of said planar body projecting beyond the jaw contacting portions to provide a positioning flange said jaw contacting portions being spaced apart the first and second of said jaw contacting portions being adapted to contact one jaw at spaced areas the third jaw contacting portion being adapted to contact the other jaw at essentillay single area and said body being cut away in the region between said second and third jaw contacting portions to leave an open space therebetween to provide dental operational clearances and to permit the spacing between said second and third jaw contacting portions to be yieldably varied.

2. The dental rest according to claim 1 wherein said body and said jaw supports are fabricated from a yieldable plastic material.

3. The dental rest according to claim 2 wherein said jaw contacting portions are hollow and are filled to a selected depth to control the overall flexibility of said dental rest.

References Cited

UNITED STATES PATENTS

| | | | |
|---|---|---|---|
| 1,081,296 | 12/1913 | De Pass | 128—12 |
| 2,220,674 | 11/1940 | Bloomheart | 128—12 |
| 3,171,203 | 3/1965 | Arroyo | 32—40 |
| 1,498,219 | 6/1924 | Williams | 128—12 |

ROBERT PESHOCK, Primary Examiner

U.S. Cl. X.R.

128—12